US009068516B2

(12) United States Patent
Maruyama et al.

(10) Patent No.: US 9,068,516 B2
(45) Date of Patent: Jun. 30, 2015

(54) ACCELERATOR PEDAL REACTION FORCE CONTROL DEVICE

(75) Inventors: Kohei Maruyama, Wako (JP); Toshihiko Sato, Wako (JP); Takayuki Yoshimura, Wako (JP); Hideto Nebuya, Wako (JP); Naoto Sen, Wako (JP); Susumu Iwamoto, Wako (JP); Kenji Hattori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 14/127,007

(22) PCT Filed: Jun. 20, 2012

(86) PCT No.: PCT/JP2012/003996
§ 371 (c)(1),
(2), (4) Date: Dec. 17, 2013

(87) PCT Pub. No.: WO2012/176442
PCT Pub. Date: Dec. 27, 2012

(65) Prior Publication Data
US 2014/0116379 A1    May 1, 2014

(30) Foreign Application Priority Data

Jun. 21, 2011  (JP) ................................. 2011-137125
Nov. 29, 2011  (JP) ................................. 2011-260700

(51) Int. Cl.
| F02D 17/02 | (2006.01) |
| F02D 41/00 | (2006.01) |
| F02D 13/06 | (2006.01) |
| F02D 11/10 | (2006.01) |
| B60K 26/02 | (2006.01) |
| F02D 11/06 | (2006.01) |
| G05G 1/30  | (2008.04) |
| G05G 5/03  | (2008.04) |

(52) U.S. Cl.
CPC ............ *F02D 17/02* (2013.01); *F02D 41/0087* (2013.01); *F02D 13/06* (2013.01); *F02D 11/105* (2013.01); *B60K 26/021* (2013.01); *F02D 11/06* (2013.01); *G05G 1/30* (2013.01); *G05G 5/03* (2013.01)

(58) Field of Classification Search
CPC ............... F02D 11/105; F02D 11/106; F02D 2011/102; F02D 2011/104; F02D 41/0087; F02D 17/02; F02D 17/023; F02D 17/026; F02D 13/06; F01L 2013/001
See application file for complete search history.

(56) References Cited

U.S. PATENT DOCUMENTS

| 7,699,129 | B2 | 4/2010 | Treharne et al. |
| 8,844,401 | B2 * | 9/2014 | Sakaguchi et al. ............... 74/513 |
| 2003/0131820 | A1 * | 7/2003 | Mckay et al. ............... 123/198 F |
| 2011/0098900 | A1 * | 4/2011 | Shiomi et al. .................... 701/70 |
| 2011/0130943 | A1 | 6/2011 | Hysko, Jr. et al. |
| 2014/0041625 | A1 * | 2/2014 | Pirjaberi et al. ............... 123/349 |
| 2014/0090623 | A1 * | 4/2014 | Beikmann ..................... 123/350 |

FOREIGN PATENT DOCUMENTS

| DE | 102007011739 | 9/2008 |
| DE | 102008000577 | 9/2009 |
| JP | H10-103097   | 4/1998 |
| JP | 2003-120339  | 4/2003 |
| JP | 2004-190598  | 7/2004 |
| JP | 2005-132225  | 5/2005 |
| JP | 2007-030551  | 2/2007 |
| JP | 2010-264831  | 11/2010 |
| JP | 2011-231621  | 11/2011 |

OTHER PUBLICATIONS

German Office Action dated Feb. 27, 2015, 5 pages.

* cited by examiner

*Primary Examiner* — Erick Solis
(74) *Attorney, Agent, or Firm* — Rankin, Hill & Clark LLP

(57) ABSTRACT

A reaction force control unit calculates a driver's requested output and then estimates a maximum output that can be generated by an engine in a current cylinder deactivation operation. Next, the reaction force control unit calculates a difference between the maximum output and the requested output as an output difference and then determines whether the output difference has reached a predetermined reaction force start threshold value, and if the determination result is Yes, the reaction force control unit estimates a number of to-be-reactivated cylinders on the basis of the output difference and the current cylinder deactivation operation state. Subsequently, the reaction force control unit sets a target reaction force on the basis of the output difference and the number of to-be-reactivated cylinders, and outputs drive current to a reaction force actuator.

20 Claims, 12 Drawing Sheets

ACCELERATOR PEDAL REACTION FORCE CONTROL DEVICE

TECHNICAL FIELD

The present invention relates to an accelerator pedal depression reaction force control device mounted on a motor vehicle provided with a cylinder deactivation engine, and particularly relates to technology for improving fuel efficiency, etc. by making it less easy to cause cylinder reactivation control to be performed in a cylinder deactivation engine.

BACKGROUND ART

In recent years, to reduce an amount of fuel consumed per unit travel distance (also referred to as fuel consumption), some multi-cylinder engines for motor vehicles are equipped with a cylinder deactivation mechanism for changing the number of active cylinders in accordance with an output requested by the driver (such engines may be called cylinder deactivation engines) (see Patent Document 1). In the cylinder deactivation engines, during cylinder deactivation operation, fuel supply to inactive cylinders is stopped and intake and discharge valves of the inactive cylinders are closed to reduce pumping loss, whereby fuel efficiency is improved significantly. On the other hand, in the case of a motor vehicle having a drive-by-wire engine mounted thereon, the accelerator pedal is not connected with an output control device (such as a throttle valve or a fuel injection device) by cables or the like and it is difficult to obtain a depression reaction force corresponding to an amount of depression only by use of a return spring, and therefore, an electrically driven reaction force actuator is used to provide the accelerator pedal with a depression reaction force (see Patent Document 2).

PRIOR ART DOCUMENT(S)

Patent Document(S)

Patent Document 1: JPH10-103097A
Patent Document 2: JP2005-132225A

BRIEF SUMMARY OF THE INVENTION

Task to be Accomplished by the Invention

In the cylinder deactivation engines described above, when the driver's requested output is increased (namely, when an amount of intake air is increased in response to depression of the accelerator pedal), the cylinder deactivation mechanism automatically performs switching from the cylinder deactivation operation to the all-cylinder operation. However, in view of improvement of fuel efficiency, it is preferred that the switching from the cylinder deactivation operation to the all-cylinder operation is not performed when the driver depresses the accelerator pedal unintentionally, so that the cylinder deactivation operation is conducted for a larger part of the entire operation period of the engine. To solve such a problem, it may be conceived to provide the instrument panel with an indicator lamp or the like for indicating the cylinder deactivation operation state, such that the indicator lamp is turned on to discourage the driver from depressing the accelerator pedal. However, such an approach may require the driver to pay attention to other than what is ahead of the vehicle, and this may increase driver fatigue and/or make driving more cumbersome.

On the other hand, in a case where the pedal reaction force of the accelerator pedal is controlled to increase the depression force for a driver having a tendency to depress the pedal slowly, for example, a driver having a tendency to depress the pedal quickly may not be able to notice a change in the pedal reaction force. Namely, there is a difference between individuals with regard to noticing of a change in the pedal reaction force (depression force) of the accelerator pedal. Consequently, a driver who does not notice a change in the depression force (a driver having a tendency to depress the pedal quickly) may depress the accelerator pedal without being aware of a switching point of driving characteristics, and therefore, the driving characteristics may be switched without being noticed by the driver. As a result, the driving characteristics may change from driving characteristics for operating the engine with priority given to the fuel efficiency to driving characteristics for operating the engine with priority given to the output power, and this may cause such a problem that the fuel efficiency is undesirably lowered.

To solve such a problem, a structure would be preferable in which the pedal reaction force is controlled such that the depression force of the accelerator pedal when a driver having a tendency to depress the pedal quickly operates the accelerator pedal at the switching point of the driving characteristics of the vehicle is increased than when a driver having a tendency to depress the pedal slowly operates the pedal.

The present invention is made to address the aforementioned problems, and the purpose of the present invention is to provide an accelerator pedal reaction force control device capable of improving fuel efficiency or the like by making it less easy to cause cylinder reactivation control to be performed in a cylinder deactivation engine.

Means to Accomplish the Task

In a first aspect of the present invention, there is provided an accelerator pedal reaction force control device that is mounted on a motor vehicle provided with a cylinder deactivation engine and controls a depression reaction force of an accelerator pedal for adjusting an output of the cylinder deactivation engine, the accelerator pedal reaction force control device including: a reaction force providing means that provides the accelerator pedal with a depression reaction force; a target depression reaction force setting means that sets a target depression reaction force for the reaction force providing means; and a depression amount detection means that detects an amount of depression of the accelerator pedal, wherein, with respect to the cylinder deactivation engine, cylinder reactivation control for increasing a number of active cylinders is performed when an operation state quantity including the amount of depression of the accelerator pedal becomes larger than a cylinder reactivation threshold value, and cylinder deactivation control for reducing the number of active cylinders is performed when the operation state quantity becomes smaller than a cylinder deactivation threshold value, and wherein, in a case where the cylinder deactivation engine is in a cylinder deactivation operation state in which the cylinders are inactive, the target depression reaction force setting means increases the target depression reaction force when a difference between the operation state quantity and the cylinder reactivation threshold value exceeds a predetermined value.

In a second aspect of the present invention, the target depression reaction force setting means sets a requested output for the cylinder deactivation engine based on the operation state quantity including the amount of depression of the accelerator pedal, estimates a maximum output that can be produced by the cylinder deactivation engine in the cylinder deactivation operation state, and calculates a difference between the maximum output and the requested output as an output difference, and the target depression reaction force setting means treats the output difference as a difference between the operation state quantity and the cylinder reactivation threshold value.

In a third aspect of the present invention, the target depression reaction force setting means increases the target depression reaction force at a predetermined increase rate as the output difference approaches zero after the output difference has reached the predetermined value.

In a fourth aspect of the present invention, the cylinder deactivation engine performs the cylinder deactivation operation in two or more stages, and the target depression reaction force setting means uses a larger increase rate for a larger number of active cylinders to be increased by the cylinder reactivation control.

In a fifth aspect of the present invention, the accelerator pedal reaction force control device further includes a vehicle speed detection means that detects a vehicle speed, wherein the target depression reaction force setting means does not increase the target depression reaction force if the vehicle speed exceeds a predetermined high speed travel determination threshold value.

In a sixth aspect of the present invention, the target depression reaction force setting means changes the increase rate of the target depression reaction force based on a result of comparison of the operation speed for a predetermined time period from a point when the accelerator pedal is depressed to a position where the target depression reaction force is to be increased with a predetermined reference speed.

In a seventh aspect of the present invention, a high reference speed serving as a reference for the operation speed on a high-speed side is preset as the reference speed, and, when the operation speed is higher than the high reference speed, the target depression reaction force setting means changes the increase rate of the target depression reaction force so as to increase a degree by which the target depression reaction force is increased.

In an eighth aspect of the present invention, a low reference speed serving as a reference for the operation speed on a low-speed side is preset as the reference speed, and, when the operation speed is lower than the low reference speed, the target depression reaction force setting means changes the increase rate of the target depression reaction force so as to decrease a degree by which the target depression reaction force is increased.

In a ninth aspect of the present invention, a low reference speed serving as a reference for the operation speed on a low-speed side is preset as the reference speed, and, when the operation speed is lower than the low reference speed, the target depression reaction force setting means changes the increase rate of the target depression reaction force so as to delay start of adjustment for increasing the target depression reaction force.

In a tenth aspect of the present invention, when the amount of operation becomes larger than or equal to the set value after the increase rate of the target depression reaction force is changed based on the result of comparison between the operation speed and the reference speed, the target depression reaction force setting means adjusts the target depression reaction force so as to increase the target depression reaction force at the changed increase rate, irrespective of the operation speed.

In an eleventh aspect of the present invention, the target depression reaction force setting means changes the increase rate of the target depression reaction force only when a fore-and-aft acceleration and a lateral acceleration generated in the vehicle each are smaller than or equal to respective predetermined values.

Effect of the Invention

According to the first aspect of the present invention, if the driver depresses the accelerator pedal unintentionally, the depression reaction force is increased before the operation state quantity exceeds the cylinder reactivation threshold value, and this makes it less easy to cause the cylinder reactivation control to be performed in the cylinder deactivation engine, thereby improving fuel efficiency.

According to the second aspect of the present invention, if the driver depresses the accelerator pedal unintentionally, the depression reaction force is increased when the output difference increases to a certain extent, and this makes it less easy to cause the cylinder reactivation control to be performed in the cylinder deactivation engine, thereby improving fuel efficiency.

According to the third aspect of the present invention, after the output difference has reached a predetermined value, the depression reaction force is increased as the accelerator pedal is depressed further, and this makes it less easy to cause the cylinder reactivation control to be performed in the cylinder deactivation engine.

According to the fourth aspect of the present invention, the depression reaction force is made larger when the cylinder reactivation control is performed to switch from the three-cylinder operation to the six-cylinder operation than when the cylinder reactivation control is performed to switch three-cylinder operation to the four-cylinder operation, for example, and the larger depression reaction force makes it less easy for the driver to depress the accelerator pedal quickly.

According to the fifth aspect of the present invention, during high speed cruising or the like, increase in the depression reaction force due to the cylinder reactivation control is prevented, so that the driver is less likely to feel discomfort in operating the accelerator pedal.

According to the sixth aspect of the present invention, the pedal reaction force can be increased before the amount of operation of the accelerator pedal reaches the threshold value for switching the driving characteristics, and further, the increase rate of the pedal reaction force can be changed in accordance with the operation speed of the accelerator pedal. Therefore, it can be ensured that a change in the pedal reaction is noticed by the driver irrespective of a difference between individual drivers.

According to the seventh aspect of the present invention, when the driver's operation speed of the accelerator pedal is high, the degree by which the pedal reaction force is increased is increased. Therefore, it is possible to make the driver whose operation speed of the accelerator pedal is high readily notice an increase in the pedal reaction force, whereby the driver can readily notice that the amount of operation of the accelerator pedal has come close to a threshold value for switching the driving characteristics.

According to the eighth aspect of the present invention, when the driver's operation speed of the accelerator pedal is low, the degree by which the pedal reaction force is increased is decreased. Therefore, it is possible to allow the driver whose operation speed of the accelerator pedal is low to easily depress the accelerator pedal operation part until the amount of operation of the accelerator pedal reaches a threshold value for switching the driving characteristics.

According to the ninth aspect of the present invention, when the driver's operation speed of the accelerator pedal is low, start of adjustment for increasing the pedal reaction force is delayed. Namely, the pedal reaction force is increased when the amount of operation of the accelerator pedal comes closer to the threshold value for switching the driving characteristics. Therefore, it is possible to allow the driver whose operation speed of the accelerator pedal is low to easily depress the accelerator pedal operation part until the amount of operation of the accelerator pedal reaches a threshold value for switching the driving characteristics.

According to the tenth aspect of the present invention, after the increase rate of the pedal reaction force is changed, the pedal reaction force is adjusted with the changed increase rate, irrespective of the operation speed of the accelerator pedal. Therefore, after the increase rate of the pedal reaction force is varied, it is possible to adjust the pedal reaction force in accordance with the driver.

According to the eleventh aspect of the present invention, when the fore-and-aft acceleration and the lateral acceleration generated in the vehicle are each larger than the respective predetermined values, the increase rate of the pedal reaction force is not changed. A large fore-and-aft acceleration of the vehicle may indicate that the vehicle is being accelerated rapidly, and thus, in an unstable state. A large lateral acceleration of the vehicle may indicate that the vehicle is turning, and thus, also in an unstable state. Thus, it is possible to avoid changing the increase rate of the pedal reaction force when the vehicle is in an unstable state such as when the vehicle is rapidly accelerating or turning, and change the increase rate when the vehicle in a stable state.

EMBODIMENTS FOR CARRYING OUT THE INVENTION

Now, with reference to the appended drawings, detailed description will be given of three embodiments where the present invention is applied to an accelerator pedal reaction force control device of a vehicle having a cylinder deactivation engine mounted thereon.

First Embodiment

Figure 1:
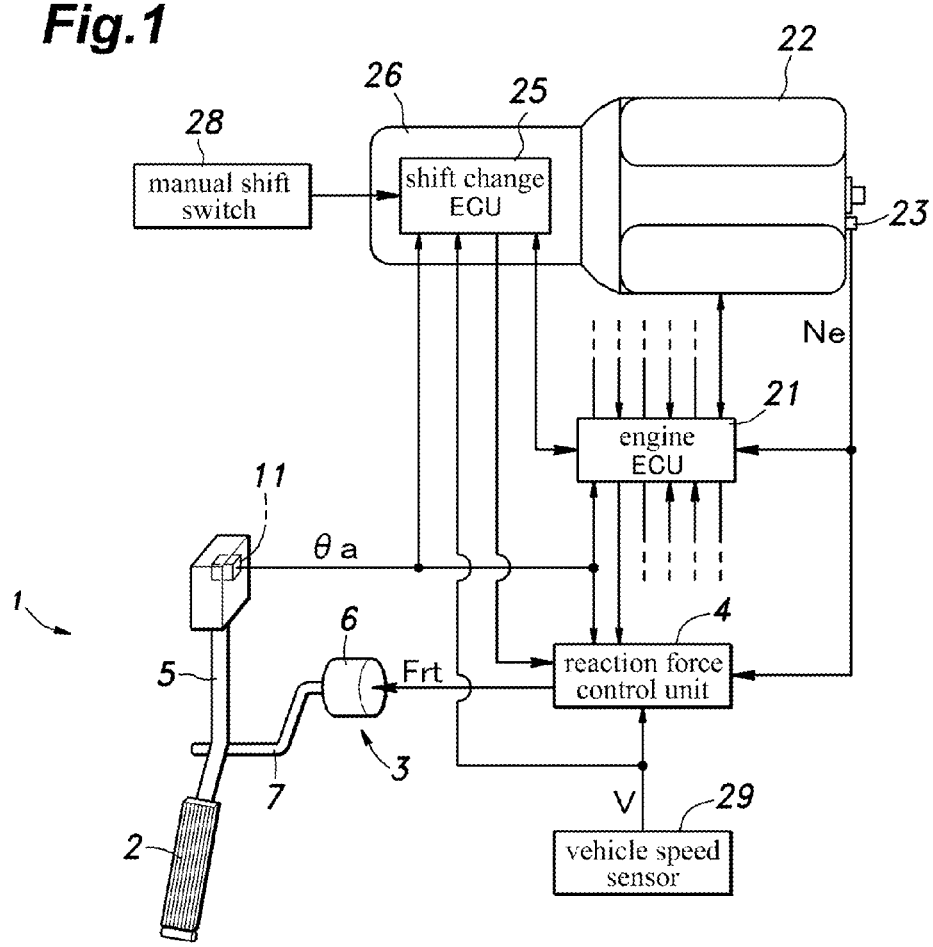
FIG. 1 is a schematic configuration diagram of an accelerator pedal reaction force control device relating to a first embodiment.

As shown in FIG. 1, an accelerator pedal reaction force control device 1 in the first embodiment includes, as main structural elements thereof, an reaction force actuator 3 for providing a depression reaction force Fr to an accelerator pedal 2 disposed at a driver's seat of a motor vehicle and a reaction force control unit 4 controlling driving of the reaction force actuator 3. It is to be noted that the motor vehicle in the present embodiment is equipped with a cylinder deactivation six-cylinder engine (hereinafter, simply referred to as an engine) 22 of a drive-by-wire type, in which, according to an operation of an accelerator pedal or the like by the driver, an engine ECU 21 sets a target output and controls a throttle valve, a fuel injection device, etc. Further, the vehicle in this embodiment is equipped with an automatic shift changer 26 including a shift change ECU 25 that sets a target shift stage and performs shift change in accordance with an operation state of the engine 22, an amount of depression of the accelerator pedal 2, etc. It is to be noted that, in accordance with a driver's requested output, a running load, etc., the engine ECU 21 changes the number of active cylinders in the engine 22 in three stages (three cylinders-four cylinders-six cylinders).

The accelerator pedal 2 has a lower end pivotably connected with a floor of the driver's seat, and, when being depressed by the driver, actuates the pedal arm 5. The pedal arm 5 is configured to pivot with an upper end thereof being as a fulcrum, and is urged by a return spring not shown in the drawings such that the accelerator pedal 2 is always urged toward an upright position. An accelerator position sensor 11 is provided on the upper end of the pedal arm 5, and an amount of depression θ a of the accelerator pedal 2 is output via the accelerator position sensor 11 to the engine ECU 21, shift change ECU 25 and reaction force control unit 4.

The engine ECU 21 performs cylinder deactivation control of the engine 22 and drives various control devices based on the amount of depression θ a of the accelerator pedal 2, an engine rotation speed Ne from a crank angle sensor 23 and other information input from various sensors. Further, the engine ECU 21 outputs operation information to the shift change ECU 25 and the reaction force control unit 4.

The shift change ECU 25 performs shift change based on the operation information of the engine 22 input from the engine ECU 21, the amount of depression θ a input from the accelerator position sensor 11, a kick-down signal, an input signal (up-shift signal and down-shift signal) from a manual shift switch 28 (such as a paddle shift switch) operated by the driver, a vehicle speed V input from a vehicle speed sensor 29, etc., and outputs shift change information to the engine ECU 21 and the reaction force control unit 4.

The reaction force control unit 4 sets a target reaction force Frt based on cylinder deactivation information of the engine 22, the engine rotation speed Ne, the amount of depression θa of the accelerator pedal 2, the shift change information and the vehicle speed V, and controls operation of the reaction force actuator 3 in accordance with the target reaction force Frt.

Figure 2:
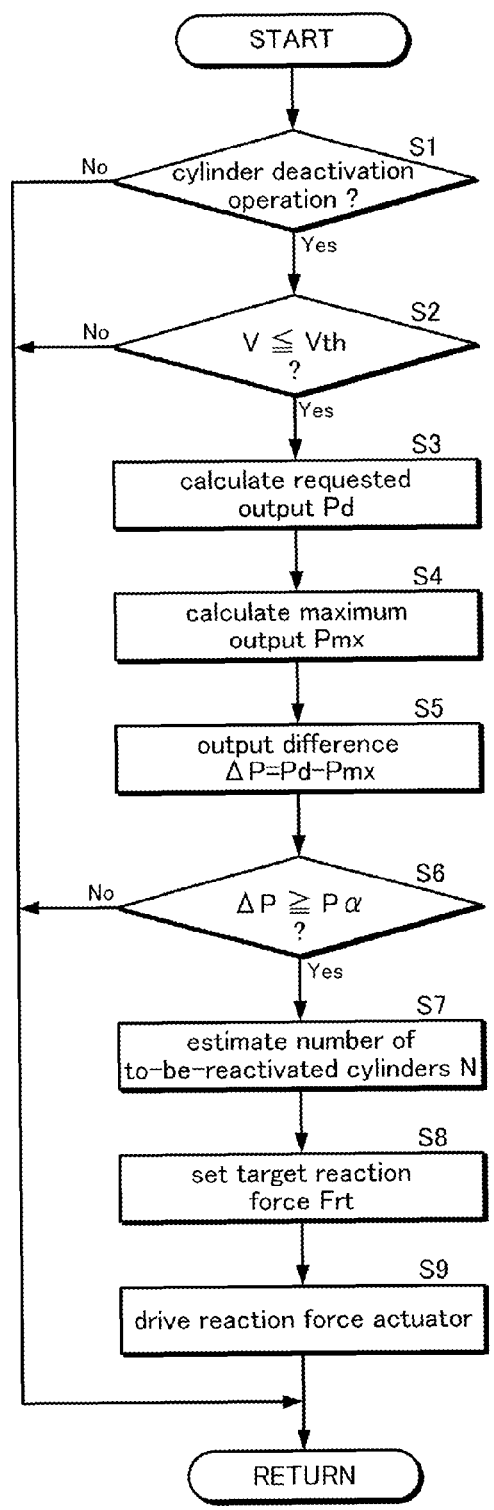
FIG. 2 is a flowchart showing a procedure of reaction force control relating to the first embodiment.

Once the motor vehicle starts running, the reaction force control unit 4 repeatedly performs reaction force control whose procedure is shown in FIG. 2 at a predetermined processing interval (e.g., 10 ms). In the reaction force control, the reaction force control unit 4 determines in step S1 of FIG. 2 whether the cylinder deactivation operation is performed based on the operation information from the engine ECU 21, and if the determination result is No, returns to the start without performing any processing.

If the engine 22 is in a cylinder deactivation operation state (namely, being operated with three cylinders or four cylinders being in active) and the determination result in step S1 is Yes, the reaction force control unit 4 determines whether a current vehicle speed V is lower than or equal to a predetermined high speed travel determination threshold value Vth (e.g., 120 km/h), and if the determination result thereof is No, returns to the start without performing any processing. This is because, when the vehicle is traveling at a high speed, a relatively large engine output is required even when the traveling speed is constant and the cylinder deactivation operation and the all-cylinder operation can be switched over from one to the other easily if the driver operates the accelerator at a gentle slope or the like, and therefore, if an excessive depression reaction force is provided, it would hinder smooth driving.

If the determination result in step S2 also is Yes, the reaction force control unit 4 calculates in step S3 a driver's requested output Pd based on the amount of depression θa of the accelerator pedal 2. Then, in step S4, the reaction force control unit 4 estimates a maximum output Pmx that the engine 22 can produce under the current cylinder deactivation operation, based on a result of detection of the atmospheric pressure, outside air temperature, etc., with reference to a maximum output map not shown in the drawings.

Subsequently, in step S5, the reaction force control unit 4 calculates a difference between the maximum output Pmx and the requested output Pd as an output difference ΔP, and thereafter, in step S6, determines whether the output difference ΔP has reached a predetermined reaction force start threshold value P a (negative value), and, if the determination result thereof is No, returns to the start without performing any processing.

If the determination result in step S6 is Yes, then, in step S7, the reaction force control unit 4 estimates a number of to-be-reactivated cylinders N based on the output difference ΔP and the current cylinder deactivation operation state. For example, in a case where the engine 22 is in a three-cylinder operation state, if the driver depresses the accelerator pedal 2 by a relatively small amount, the output difference ΔP becomes a low value, and thus, the number of to-be-reactivated cylinders N is estimated to be one (namely, switched over to a four-cylinder operation). On the other hand, if the driver depresses the accelerator pedal 2 by a relatively large amount, the output difference ΔP becomes a high value, and thus, the number of to-be-reactivated cylinders N is estimated to be three (namely, switched over to a six-cylinder operation). Further, in a case where the engine 22 is in the four-cylinder operation state, if the driver depresses the accelerator pedal 2 by a relatively large amount, the number of to-be-reactivated cylinders N is estimated to be two (namely, switched over to the six-cylinder operation).

Figure 3:
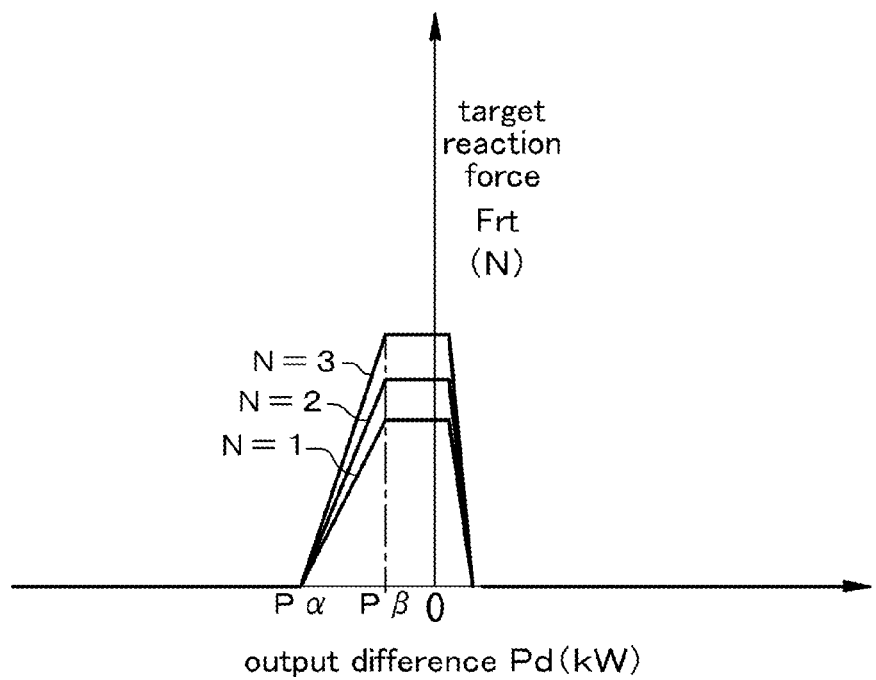
FIG. 3 is a target reaction force map relating to the first embodiment.

Then, in step S8, the reaction force control unit 4 sets the target reaction force Frt by use of a target reaction force map shown in FIG. 3 in accordance with the output difference ΔP and the number of to-be-reactivated cylinders N, and thereafter, in step S9, outputs a drive current to the reaction force actuator 3. As shown in FIG. 3, the target reaction force Frt increases linearly from the point where the output difference ΔP reaches the reaction force start threshold value Pα until the output difference ΔP reaches a maximum reaction force threshold value Pβ, and decreases sharply to zero after the output difference ΔP exceeds zero (namely, after the cylinder reactivation control is performed). Further, as shown in FIG. 3, the larger the number of to-be-reactivated cylinders N is, the larger the target reaction force Frt becomes.

In this embodiment, the foregoing structure makes it less easy for the driver to perform such depression of the accelerator pedal 2 that would require cylinder reactivation control to be performed (particularly, pedal depression that would result in a large number of to-be-reactivated cylinders N), and thus, can achieve significant improvement in fuel efficiency.

Second Embodiment

In the following, detailed description will be made of a second embodiment for carrying out the present invention, with reference to the drawings as necessary.

Figure 4:
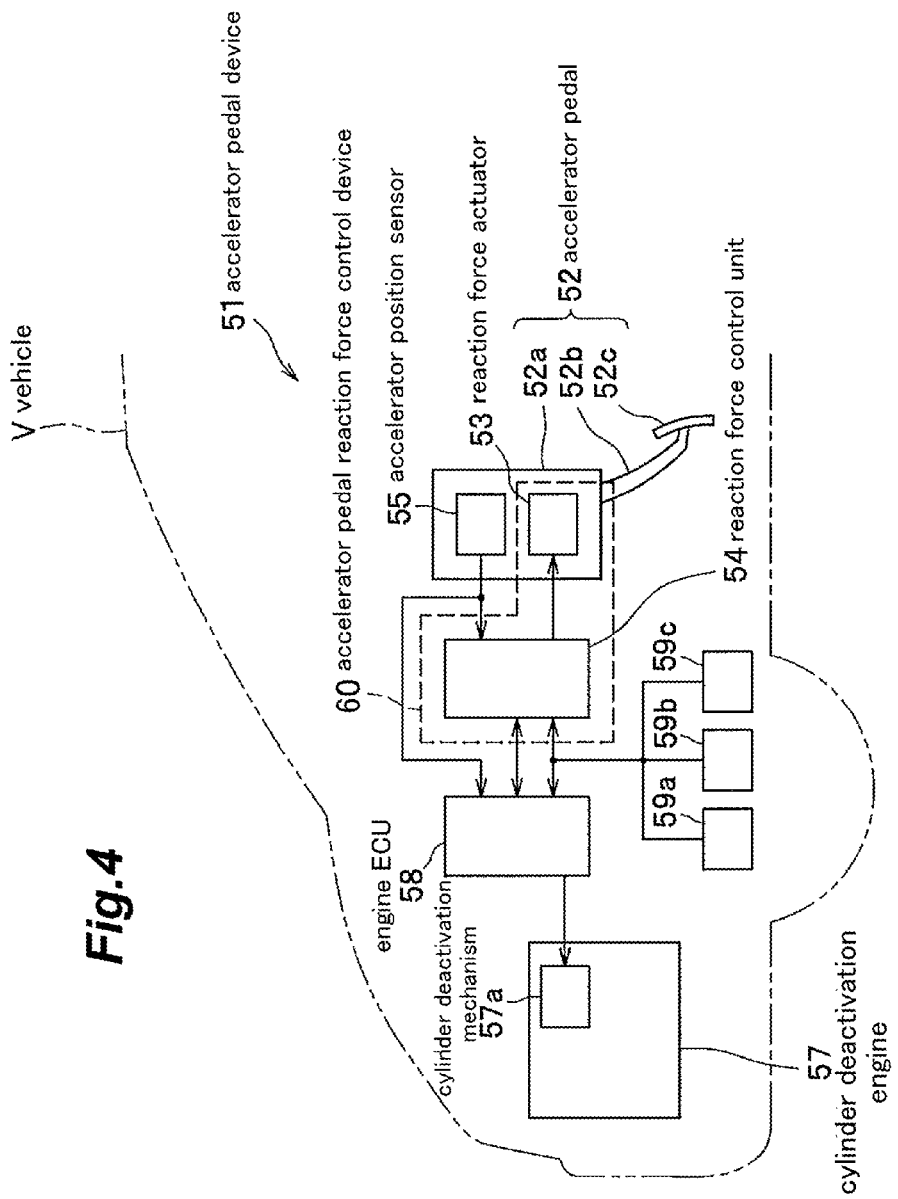
FIG. 4 is a configuration diagram of an accelerator pedal device provided to a vehicle relating to second and third embodiments.

As shown in FIG. 4, an accelerator pedal device 51 in the second embodiment is provided to the vehicle V, such that the accelerator pedal device 51 includes an accelerator pedal 52 formed by attaching a pedal pad 52c to be depressed by the driver to an end of a shaft member 52b pivotable about a support part 52a serving as a fulcrum, a reaction force actuator 53 for generating a reaction force provided to the accelerator pedal 52 (additional reaction force), and a reaction force control unit 54 configured to control the reaction force actuator 53.

The reaction force actuator 53 is a reaction force providing means for providing the generated reaction force to the accelerator pedal 52 to adjust a pedal reaction force, and is controlled by the reaction force control unit 54 serving as a control means. The reaction force actuator 53 and the reaction force control unit 54 jointly forms an accelerator pedal reaction force control device 60 relating to the second embodiment.

The reaction force actuator 53 may have any structure so long as it can generate a required additional reaction force to be provided to the accelerator pedal 52. For example, an actuator having a structure disclosed in the aforementioned Patent Document 1 may be used.

Further, the accelerator pedal device 51 is equipped with an accelerator position sensor 55 serving as an operation amount detection means for detecting an amount of operation of the accelerator pedal 52, such that a detection value thereof can be input to the reaction force control unit 54. The reaction force control unit 54 is configured to be capable of calculating the amount of operation of the accelerator pedal 52 based on the detection value input from the accelerator position sensor 55, and, based on a temporal change in the amount of operation, calculating an operation speed of the accelerator pedal 52. According to such a configuration, in the second embodiment, the reaction force control unit 54 functions as an operation speed detection means that detects an operation speed of the accelerator pedal 52.

The reaction force control unit 54 is further configured to be capable of calculating an opening degree of a throttle valve not shown in the drawings (throttle opening degree) based on the amount of operation of the accelerator pedal 52. Since the throttle opening degree changes with the amount of operation of the accelerator pedal 52, the reaction force control unit 54 may have a map (opening degree map) showing the relationship between the amount of operation and the throttle opening degree, for example, such that the reaction force control unit 54 calculates the amount of operation based on the detection value input from the accelerator position sensor 55 and calculates the throttle opening degree corresponding to the calculated amount of operation by referring to the opening degree map. Further, the reaction force control unit 54 calculates a speed of change of the throttle opening degree (throttle speed Svr) based on the temporal change of the throttle opening degree.

In the accelerator pedal reaction force control device 60 configured as described above, the reaction force control unit 54 is configured to control the reaction force actuator 53 in accordance with the throttle opening degree and generate additional reaction force corresponding to the throttle opening degree such that the additional reaction force is provided to the accelerator pedal 52.

For example, the reaction force control unit 54 is configured to determine the strength of the additional reaction force to be provided to the accelerator pedal 52 based on a map (reaction force setting map) prepared in advance. For instance, if a reaction force setting map indicating the relationship between the throttle opening degree and the strength of the additional reaction force to be provided to the accelerator pedal 52, which is predetermined through experiment and measurement performed beforehand, is pre-stored in a storage unit (not shown in the drawings) of the reaction force control unit 54, the reaction force control unit 54 can refer to the reaction force setting map using the calculated throttle opening degree, to thereby determine the strength of the additional reaction force to be provided to the accelerator pedal 52.

Further, the vehicle V in the second embodiment is configured to have a cylinder deactivation engine 57 equipped with a cylinder deactivation mechanism 57a for switching between a cylinder deactivation operation in which some of the cylinders are inactive and an all-cylinder operation in which all of the cylinders are active, and an engine control means (the engine ECU 58) for controlling switching between the cylinder deactivation operation and the all-cylinder operation of the cylinder deactivation engine 57 according to VCM (Variable Cylinder Management).

The engine ECU 58 calculates an engine output of the cylinder deactivation engine 57 appropriately based on the throttle opening degree, driving state of the vehicle V and driving environment of the vehicle V, and controls the cylinder deactivation engine 57 so as to achieve the calculated engine output.

In the second embodiment, the driving state of the vehicle V includes a shift position, state of acceleration, state of deceleration, state of sideslip, etc.

The driving environment of the vehicle V is the surrounding environment through which the vehicle V is traveling, and may include the slope of the road surface on which the vehicle is traveling and whether the road is uphill/downhill.

It is to be noted that the reaction force control unit 54 and the engine ECU 58 may be configured integrally.

The engine ECU 58 detects acceleration or deceleration from an acceleration in the fore-and-aft direction (fore-and-aft acceleration) of the vehicle V, as well as detects sideslip from an acceleration in the lateral direction (lateral acceleration) of the vehicle V.

To achieve such functions, the vehicle V is preferably equipped with a fore-and-aft acceleration detection means 59a configured to detect the fore-and-aft acceleration, and a lateral acceleration detection means 59b configured to detect the lateral acceleration. The fore-and-aft acceleration detection means 59a may be an acceleration sensor that measures an acceleration generated in the fore-and-aft direction of the vehicle V, but is not limited thereto. Further, the lateral acceleration detection means 59b may be an acceleration sensor that measures an acceleration generated in the lateral direction of the vehicle V, but is not limited thereto.

Preferably, the vehicle V is further equipped with a slope detection means 59c that detects a slope of the road on which the vehicle is running. The slope detection means 59c may be a tiltmeter that measures a tilt of the vehicle V in the fore-and-aft direction, but is not limited thereto.

The engine ECU 58 can determine whether the vehicle V is running uphill or downhill from the direction of travel of the vehicle V and the detected slope of the road on which the vehicle is running.

It is to be noted that known technology may be used as a control method (VCM), according to which the cylinder deactivation engine 57 is controlled based on the engine output calculated by the engine ECU 58 depending on the throttle opening degree, driving state of the vehicle V and driving environment of the vehicle V.

In a case where the engine ECU 58 switches between the cylinder deactivation operation and the all-cylinder operation based on the throttle opening degree, a threshold value (hereinafter, switching opening degree Sth) of the throttle opening degree for switching between the cylinder deactivation operation and the all-cylinder operation is determined based on the calculated engine output, for example. When the throttle opening degree becomes larger than or equal to the threshold value, a command for switching from the cylinder deactivation operation to the all-cylinder operation is transmitted to the cylinder deactivation mechanism 57a. The cylinder deactivation mechanism 57a activates the all cylinders of the cylinder deactivation engine 57, to switch from the cylinder deactivation operation to the all-cylinder operation.

The calculation of the threshold value (switching opening degree Sth) for switching between the cylinder deactivation operation and the all-cylinder operation based on the engine output as described above may be achieved by use of known technology.

It is to be noted that, similarly to the reaction force control unit 54, the engine ECU 58 can calculate the throttle opening degree based on the detection value input from the accelerator position sensor 55.

Further, in the second embodiment, the reaction force control unit 54 controls the reaction force actuator 53 to provide the accelerator pedal 52 with an additional reaction force with a predetermined strength (standard additional reaction force) when the throttle opening degree reaches the threshold value (switching opening degree Sth) for switching between the cylinder deactivation operation and the all-cylinder operation.

Figure 5A:
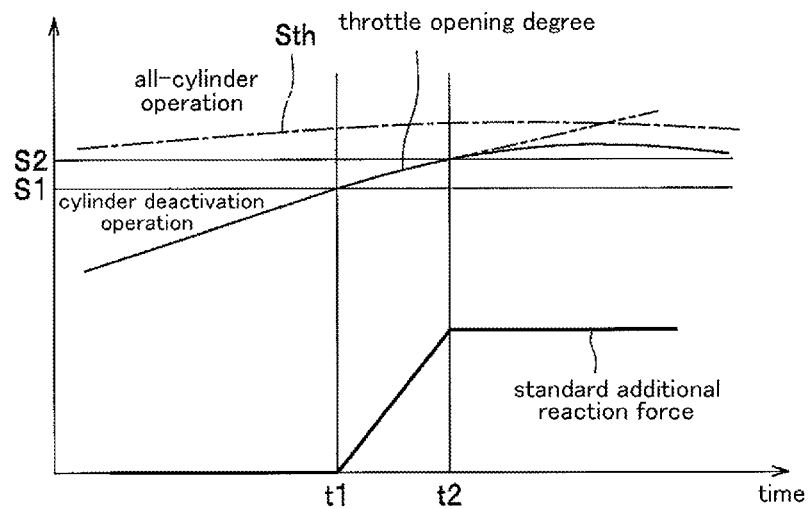
FIG. 5a is a diagram showing a case in which a standard additional reaction force is generated is generated in connection with a throttle opening degree and FIG. 5b is a diagram showing a case in which an enhanced additional reaction force is generated in connection with the throttle opening degree, in the second and third embodiments.

As shown in FIG. 5a, in a case where the cylinder deactivation operation is switched over to the all-cylinder operation when the throttle opening degree reaches the switching opening degree Sth calculated by the engine ECU 58, the reaction force control unit 54 (see FIG. 4) controls the reaction force actuator 53 (see FIG. 4) to start generating an additional reaction force to be provided to the accelerator pedal 52 (see FIG. 4) at a point (time t1 in FIG. 5a) when the throttle opening degree becomes a predetermined set value (hereinafter, a reaction force generation opening degree S1) smaller than the switching opening degree Sth. Then, when, as the driver depresses the accelerator pedal 52 further and the throttle opening degree increases, the throttle opening degree reaches another predetermined throttle opening degree (hereinafter, a maximum reaction force opening degree S2) closer to the switching opening degree Sth, the reaction force control unit 54 controls the reaction force actuator 53 so as to maximize the strength of the additional reaction force, such that the generated additional reaction force is provided to the accelerator pedal 52 (time t2 in FIG. 5*a*).

It is to be noted that each of the reaction force generation opening degree S1 and the maximum reaction force opening degree S2 is preferably set in advance through experiment and measurement or the like. Further, the reaction force generation opening degree S1 and the maximum reaction force opening degree S2 may be a fixed value or may be a variable that varies in response to a change in the switching opening degree Sth. For example, each of the reaction force generation opening degree S1 and the maximum reaction force opening degree S2 may be set such as a predetermined percentage of the switching opening degree Sth (e.g., the reaction force generation opening degree S1 is set as 70% of the switching opening degree Sth and the maximum reaction force opening degree S2 is set as 90% of the switching opening degree Sth).

The driver can recognize that the throttle opening has come close to the threshold opening degree at which the operation of the cylinder deactivation engine 57 (see FIG. 4) is to be switched from the cylinder deactivation operation to the all-cylinder operation, by recognizing an increase in the pedal reaction force caused by providing the additional reaction force generated by the reaction force actuator 53 (see FIG. 4) to the accelerator pedal 52 (see FIG. 4). If the driver wishes to continue the cylinder deactivation operation (namely, wishes not to switch the operation to the all-cylinder operation), the driver reduces the depression force input to the accelerator pedal 52 (see FIG. 4). Thus, if the driver wishes not to switch the operation to the all-cylinder operation, the throttle speed Svr is lowered (after time t1 in FIG. 5*a*).

In a case where the driver wishes to switch the operation to the all-cylinder operation such as during acceleration, the driver needs to depress the accelerator pedal 52 against the increased pedal reaction force as a result of the additional reaction force provided, and therefore, the throttle speed Svr is lowered at the time t1 where the additional reaction force begins to be generated. As the driver further depresses the accelerator pedal 52 against the increased pedal reaction force even after the time t2 where the additional reaction force reaches the maximum value, the throttle opening degree is increased though the throttle speed Svr is lowered (indicated by a long and double-short dashed line in FIG. 5*a* after time t2).

Figure 5B:
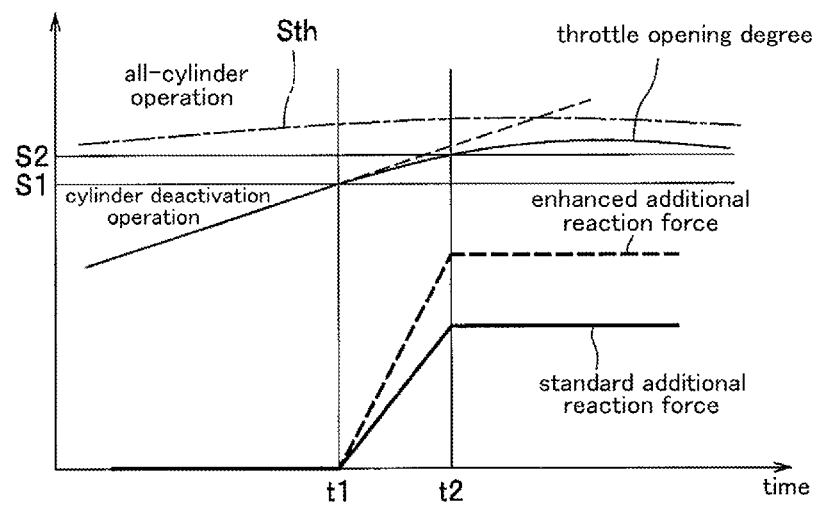

In contrast, in a case where the driver has a tendency to operate the pedal quickly (with a large force), such as when the driver has a high leg strength, the driver may depress the accelerator pedal 52 with a large force even after the time t1 at which the throttle opening degree has reached the reaction force generation opening degree S1 and an additional reaction force begins to be provided to the accelerator pedal 52, and therefore, often times, the throttle speed Svr does not change (indicated by a thin broken line in FIG. 5*b*).

Therefore, in the second embodiment, the reaction force control unit 54 (see FIG. 4) is configured such that, if the throttle speed Svr is higher than a preset speed serving as a reference on a high-speed side (high reference speed SVH) after the time t1 at which the throttle opening degree has reached the reaction force generation opening degree S1 and an additional reaction force begins to be generated, the reaction force control unit 54 determines that the driver has a tendency to operate the pedal quickly and not to notice the additional reaction force provided to the accelerator pedal 52 (see FIG. 4) (hereinafter, such a driver will be referred to as a type I driver).

If it is determined that the driver is a type I driver, the reaction force control unit 54 controls the reaction force actuator 53 to generate an additional reaction force (hereinafter, enhanced additional reaction force) larger than the standard additional reaction force determined based on the throttle opening degree, thereby changing an increase rate of the pedal reaction force. For example, the reaction force control unit 54 causes the reaction force actuator 53 to generate an enhanced additional reaction force larger than the standard additional reaction force, as indicated by a thick broken line in FIG. 5*b*.

For example, the reaction force control unit 54 is configured to perform "pedal reaction force setting" when the vehicle V (see FIG. 4) is started (when the ignition is turned on) to set the additional reaction force to be generated. Namely, a setting is made for causing the reaction force actuator 53 to generate the standard additional reaction force or to generate the enhanced additional reaction force. With reference to the flowchart shown in FIG. 6, description will be given of the procedure for the "pedal reaction force setting" (in the following description, refer to FIG. 4, FIG. 5 and FIG. 7, as necessary).

Upon initiation of the pedal reaction force setting, the reaction force control unit 54 calculates the throttle opening degree based on the detection value of the accelerator position sensor 55 (step S1), and compares the calculated throttle opening degree with the reaction force generation opening degree S1 (step S2).

If the calculated throttle opening degree is smaller than the reaction force generation opening degree S1 (step S2: No), the reaction force control unit 54 causes the process to return to step S1. On the other hand, the calculated throttle opening degree is larger than or equal to the reaction force generation opening degree S1 (step S2: Yes), the reaction force control unit 54 controls the reaction force actuator 53 to generate the standard additional reaction force (step S3) such that the additional reaction force is provided to the accelerator pedal 52.

Figure 7:
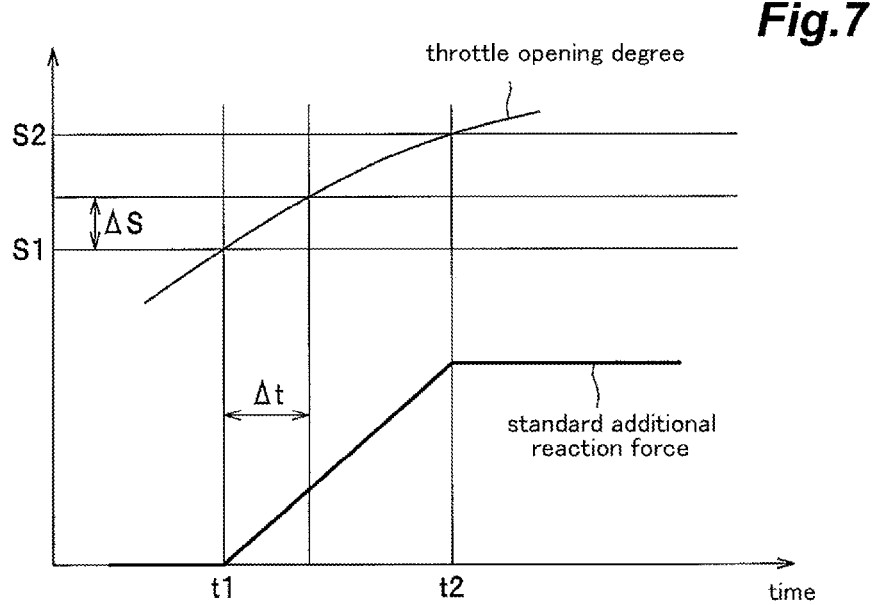
FIG. 7 is a diagram for explaining a time and a throttle opening degree when an operation speed of the accelerator pedal is calculated in the second and third embodiments.

Further, the reaction force control unit 54 calculates the throttle speed Svr (step S4). For example, as shown in FIG. 7, the reaction force control unit 54 calculates an opening degree change ΔS indicating a change in the throttle opening degree from the reaction force generation opening degree S1 over a predetermined measurement time period Δt after the time t1, at which the throttle opening degree reaches the reaction force generation opening degree S1 and the additional reaction force begins to be generated, and uses a value (ΔS/Δt) obtained by dividing the opening degree change ΔS with the measurement time period Δt as the throttle speed Svr.

When the calculated throttle speed Svr is lower than the predetermined high reference speed SVH (step S5: No), the reaction force control unit 54 terminates the pedal reaction force setting without making a change. On the other hand, when the calculated throttle speed Svr is higher than or equal to the predetermined high reference speed SVH (step S5: Yes), the reaction force control unit 54 sets itself in a reaction force enhancement mode (step S6) and terminates the pedal reaction force setting.

The reaction force enhancement mode is a mode in which, when the throttle opening degree reaches the reaction force generation opening degree S1, the reaction force control unit 54 controls the reaction force actuator 53 to generate an enhanced additional reaction force. Specifically, as shown in FIG. 5b, an enhanced additional reaction force larger than the standard additional reaction force determined based on the reaction force setting map is generated by the reaction force actuator 53 and provided to the accelerator pedal 52. For example, the reaction force control unit 54 controls the reaction force actuator 53 to generate an enhanced additional reaction force that is a predetermined factor times the standard additional reaction force (e.g., 1.5 times the standard additional reaction force). Owing to such a configuration, the reaction force control unit 54 can provide the accelerator pedal 52 with the enhanced additional reaction force generated by the reaction force actuator 53, as shown by a thick broken line in FIG. 5b. Thereby, it is possible to increase the degree by which the pedal reaction force of the accelerator pedal 52 is increased.

Further, it is preferred that, while the reaction force control unit 54 is set in the reaction force enhancement mode, an enhanced additional reaction force is provided to the accelerator pedal 52 when the throttle opening degree reaches the reaction force generation opening degree S1. Such a configuration allows the type I driver having a tendency to depress the accelerator pedal 52 quickly to readily notice an increase in the pedal reaction force of the accelerator pedal 52. Therefore, it is possible to prevent the engine operation characteristics (namely, driving characteristics of the vehicle V) from being switched without being noticed by the type I driver. For example, switching of the operation of the cylinder deactivation engine 57 (see FIG. 4) from the cylinder deactivation operation to the all-cylinder operation without being aware of by the type I driver is prevented, whereby reduction in fuel efficiency can be prevented.

Figure 6:
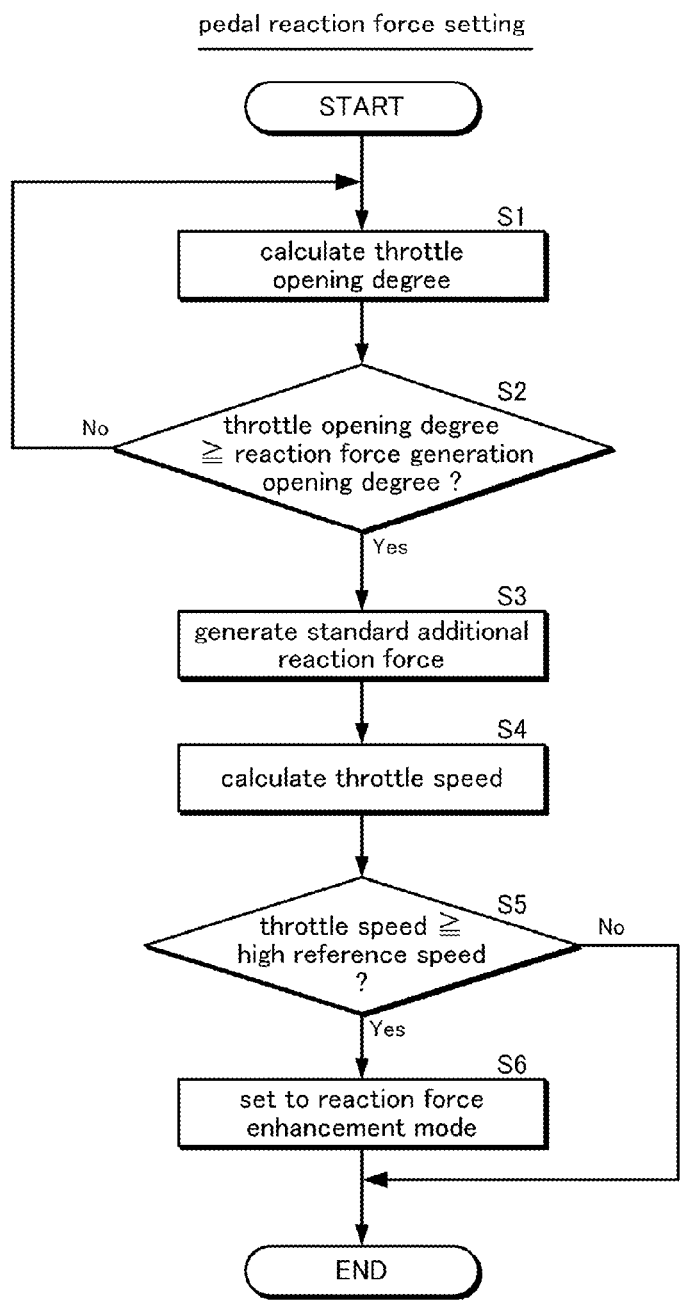
FIG. 6 is a flowchart showing a procedure for setting a pedal reaction force in the second and third embodiments.

In the flowchart shown in FIG. 6, it is configured that the reaction force control unit 54 is set in the reaction force enhancement mode when the determination in step S5 is performed once and it is found that throttle speed Svr is higher than or equal to the predetermined high reference speed SVH. However, the configuration should not limited thereto, and it is possible that the determination in step S5 is performed twice or more, and, when the throttle speed Svr is found to be higher than or equal to the predetermined high reference speed SVH in each determination, the reaction force control unit 54 is set in the reaction force enhancement mode.

Alternatively, the reaction force control unit 54 may be set in the reaction force enhancement mode when the determination in step 5 is performed twice or more and the throttle speed Svr is found to be higher than or equal to the predetermined high reference speed SVH in one of the determinations.

It is also possible that the reaction force control unit 54 (see FIG. 4) acquires a state of the vehicle V (see FIG. 4) when setting itself in the reaction force enhancement mode, such that the reaction force control unit 54 sets itself in the reaction force enhancement mode except for when the state of the vehicle V is a particular state. The particular state of the vehicle V herein may be during turning or acceleration, for example.

During turning, even a driver having a tendency to depress the pedal slowly may depress the accelerator pedal 52 (see FIG. 4) quickly with a large force to prevent decrease in the vehicle speed, and this may cause the reaction force control unit 54 (see FIG. 4) to determine that the driver is a type I driver.

Further, during acceleration, even a driver having a tendency to depress the pedal slowly may depress the accelerator pedal 52 quickly with a large force, and this may cause the reaction force control unit 54 to determine that the driver is a type I driver.

In the following, with reference to FIG. 8, description will be made of a procedure according to which the reaction force control unit 54 (see FIG. 4) sets itself in the reaction force enhancement mode except for when the vehicle V is in a particular state (in the following description, see FIG. 4, FIG. 5 and FIG. 7, as necessary).

Figure 8:
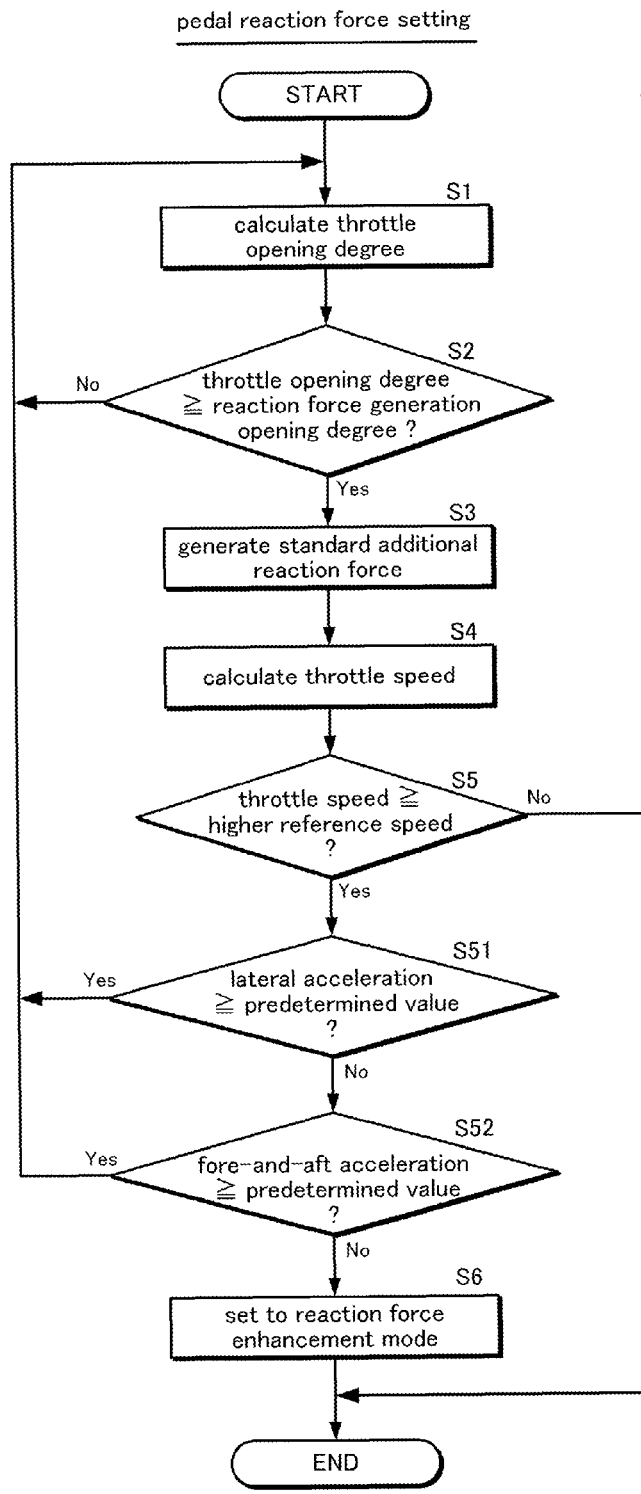
FIG. 8 is a flowchart in which a procedure for determining a state of the vehicle is added to the procedure for setting the pedal reaction force, in the second and third embodiments.

It is to be noted that steps S1 to S5 in FIG. 8 are the same as steps S1 to S5 in FIG. 6, and thus, detailed description thereof will be omitted.

As shown in FIG. 8, in the pedal reaction force setting, when the throttle speed is higher than or equal to the high reference speed SVH (step S5: Yes), the reaction force control unit 54 determines whether the lateral acceleration detected by the lateral acceleration detection means 59b (see FIG. 4) is larger than a predetermined value (step S51).

If the lateral acceleration is found to be larger than the predetermined value in step S51 (step S51: Yes), the reaction force control unit 54 determines that the vehicle V is turning, and causes the process to return to step S1 without setting itself in the reaction force enhancement mode.

On the other hand, if the lateral acceleration is found to be smaller than or equal to the predetermined value in step S51 (step S51: No), the reaction force control unit 54 determines whether the fore-and-aft acceleration detected by the fore-and-aft acceleration detection means 59a is larger than a predetermined value (step S52).

If it is found that the fore-and-aft acceleration is larger than the predetermined value (step S52: Yes), the reaction force control unit 54 determines that the driver is accelerating the vehicle V, and causes the process to return to step S1 without setting itself in the reaction force enhancement mode.

On the other hand, if the fore-and-aft acceleration is found to be smaller than or equal to the predetermined value in step S52 (step S52: No), the reaction force control unit 54 sets itself in the reaction force enhancement mode (step S6), and terminates the pedal reaction force setting.

As described in the foregoing, owing to the configuration in which only when the lateral acceleration and the fore-and-aft acceleration generated in the vehicle V (see FIG. 4) are lower than the respective predetermined values, the reaction force control unit 54 (see FIG. 4) is set in the reaction force enhancement mode, it is possible to prevent the reaction force control unit 54 from erroneously determining a driver having a tendency to depress the pedal slowly to be a type I driver when the vehicle V is making a turn or being accelerated.

It is to be noted that the predetermined value compared with the fore-and-aft acceleration in step S51 and the predetermined value compared with the lateral acceleration in step S52 by the reaction force control unit 54 are preferably set in advance through experiment and measurement or the like.

Further, in a case where the vehicle V is equipped with a selector switch for selecting a "sport driving mode," the reaction force control unit 54 may be configured not to set itself in the reaction force enhancement mode when the "sport driving mode" is selected by the switch.

During sport driving, even a driver having a tendency to depress the pedal slowly may depress the accelerator pedal 52 quickly with a large force to make the vehicle V run agilely, and thus, the reaction force control unit 54 may determine the driver to be a type I driver.

By not setting the reaction force control unit 54 in the reaction force enhancement mode when the "sport driving mode" is selected, it is possible to prevent the enhanced additional reaction force from being provided to the pedal operation part 52 when the driver has a tendency to depress the pedal slowly.

As described in the foregoing, in the accelerator pedal device 51 (see FIG. 4) of the second embodiment, when the throttle opening degree is larger than the reaction force generation opening degree S1 (see FIG. 5), the reaction force control unit 54 (see FIG. 4) provides the accelerator pedal 52 with an enhanced additional reaction force that is larger than the standard additional reaction force if the accelerator pedal 52 (see FIG. 4) is being operated by a type I driver having a tendency to depress the pedal quickly. Such a configuration can make the pedal reaction force of the accelerator pedal 52 change by a large amount, and thereby enables the type I driver to readily notice the switching point between the cylinder deactivation operation and the all-cylinder operation. Therefore, it is possible to avoid a problem that fuel efficiency may be reduced due to switching from the cylinder deactivation operation to the all-cylinder operation without being noticed by the type I driver.

Figure 9:
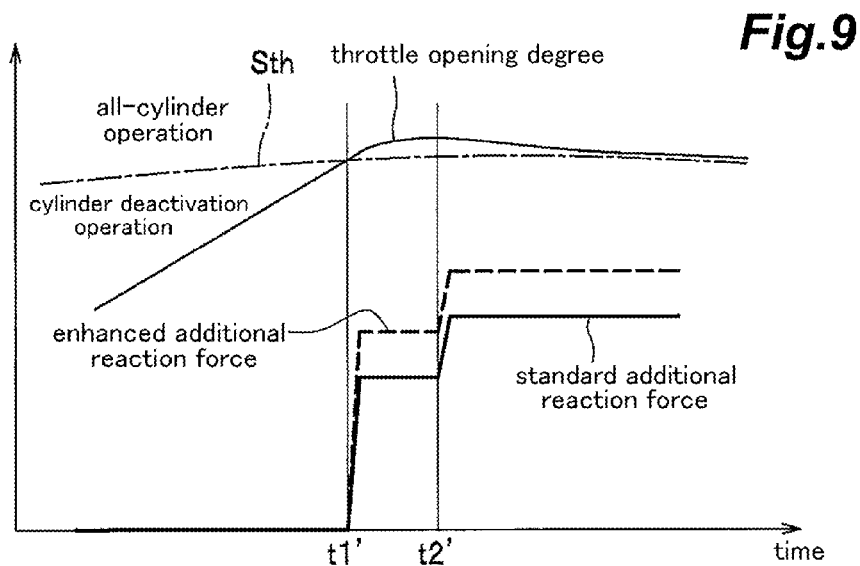
FIG. 9 is a diagram showing a case in which an additional reaction force is generated when the throttle opening degree reaches a switching opening degree in the second and third embodiments.

In an exemplary case where, as shown in FIG. 9, an additional reaction force is generated and provided to the accelerator pedal 52 (see FIG. 4) when the throttle opening degree reaches the switching opening degree Sth (time t1'), and thereafter, when the throttle opening degree has increased to a predetermined opening degree (time t2'), the maximum value of the additional reaction force is provided to the accelerator pedal 52 (namely, in a case where the reaction force generation opening degree S1 is set to be equal to the switching opening degree Sth), it is preferred that the reaction force control unit 54 (see FIG. 4) performs the pedal reaction force setting from the time t1' at which the throttle opening degree first reaches the switching opening degree Sth.

In this case, the reaction force control unit 54 (see FIG. 4) may be configured to determine that the driver depressing the accelerator pedal 52 (see FIG. 4) is a type I driver when the throttle speed Svr after the time t1' is higher than or equal to the high reference speed SVH. Then, the reaction force control unit 54 sets itself in the reaction force enhancement mode, and when the throttle opening degree reaches the switching opening degree Sth for the second time and thereafter, causes the reaction force actuator 53 to generate an enhanced additional reaction force larger than the standard additional reaction force.

Third Embodiment

The accelerator pedal device and the accelerator pedal reaction force control device regarding the third embodiment are preferably configured similarly to the accelerator pedal device 51 and the accelerator pedal reaction force control device 60 regarding the second embodiment shown in FIG. 4, respectively.

Figure 10:
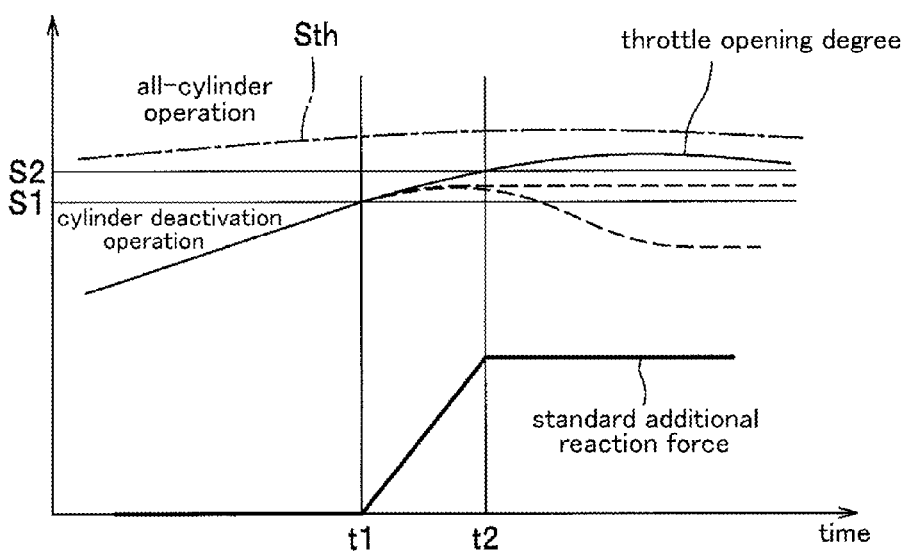
FIG. 10 is a diagram showing a case in which an operation speed of the accelerator pedal operation part is lowered after generation of an additional reaction force in the second and third embodiments.

As shown in FIG. 10, for example, there may be a case in which when the throttle opening degree reaches the reaction force generation opening degree S1 and an additional reaction force is provided to the accelerator pedal 52 (see FIG. 4), the throttle speed Svr decreases rapidly as indicated by a broken line. Further, there may be a case in which the throttle opening degree decreases rapidly with an increase in the additional reaction force.

The reaction force control unit 54 (see FIG. 4) in the third embodiment determines that the leg strength of the driver depressing the accelerator pedal 52 (see FIG. 4) is low if the throttle speed Svr decreases rapidly when an additional reaction force is provided to the accelerator pedal 52 (see FIG. 4) or if the throttle opening degree decreases as the additional reaction force increases.

In a case where the leg strength of the driver is low, there may be a case in which, if a standard additional reaction force determined based on the throttle opening degree is provided to the accelerator pedal 52, it becomes difficult to depress the accelerator pedal 52 to switch the cylinder deactivation operation to the all-cylinder operation when it is desired to accelerate the vehicle V (see FIG. 4). Therefore, if it is determined that the driver depressing the accelerator pedal 52 is a driver with a lower leg strength (hereinafter, a type II driver), the reaction force control unit 54 of the third embodiment sets itself in a reaction force reduction mode or a reaction force delay mode.

The reaction force reduction mode is a mode in which the reaction force actuator 53 is controlled to change the increase rate of the pedal reaction force such that, when the throttle opening degree reaches the reaction force generation opening degree S1, a reaction force (hereinafter, reduced additional reaction force) smaller than the standard additional reaction force is generated. Namely, as indicated by a thick long and short dashed line in FIG. 11*a*, the reaction force actuator 53 generates a reduced additional reaction force smaller than the standard additional reaction force determined based on the throttle opening degree and the reaction force setting map and provides the reduced additional reaction force to the accelerator pedal 52. For example, the reaction force control unit 54 controls the reaction force actuator 53 such that the reduced additional reaction force is generated as a predetermined percentage of the standard additional reaction force (e.g., 0.8 times the standard additional reaction force).

Figure 11A:
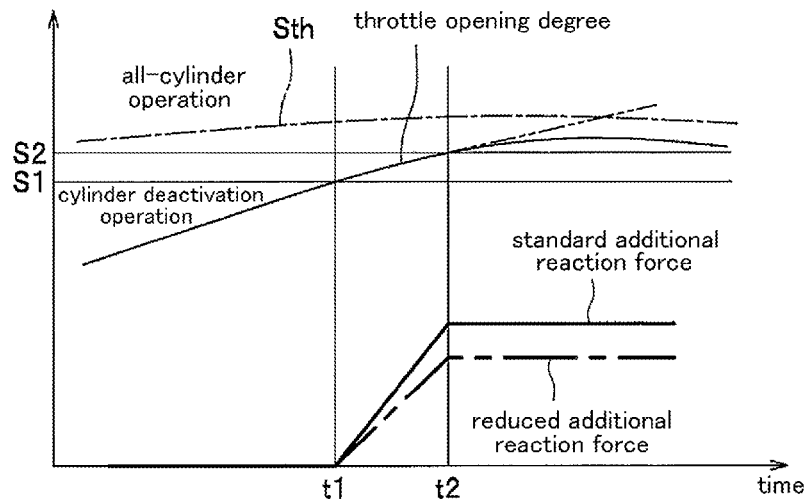
FIG. 11 is a diagram showing a case in which a reduced additional reaction force that is smaller than the standard additional reaction force is generated in the second and third embodiments.

According to such a configuration, as indicated by a thick long and short dashed line in FIG. 11*a*, the reaction force control unit 54 can generate a reduced additional reaction force smaller than the standard additional reaction force and provide the reduced additional reaction force to the accelerator pedal 52, such that the increase rate of the pedal reaction force is changed.

In this case, the degree by which the pedal reaction force of the accelerator pedal 52 is increased is reduced, whereby even when the driver is a type II driver with a lower leg strength, the driver can easily depress the accelerator pedal 52 to cause switching from the cylinder deactivation operation to the all-cylinder operation, as necessary.

Figure 11B:
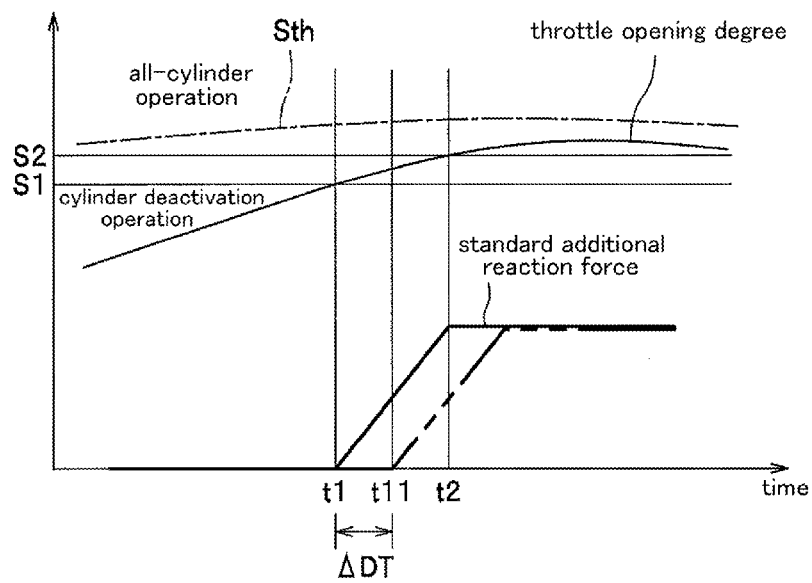

The reaction force delay mode is a mode in which the increase rate of the pedal reaction force is changed by delaying generation of the additional reaction force. Namely, as shown by a thick long and double-short dashed line in FIG. 11*b*, the reaction force control unit 54 (see FIG. 4) set in the reaction force delay mode does not cause the reaction force actuator 53 to generate an additional reaction force at the time (time t1) when the throttle opening degree reaches the reaction force generation opening degree S1, and, if the throttle opening degree is larger than or equal to the reaction force generation opening degree S1 after time 11, at which a predetermined time ΔDT has elapsed from the time t1, the reaction force control unit 54 causes the reaction force actuator 53 to generate an additional reaction force such that the additional reaction force is provided to the accelerator pedal 52.

According to this configuration, an additional reaction force is provided to the accelerator pedal 52 after a throttle opening degree closer to the switching opening degree Sth than the reaction force generation opening degree S1 is reached, and thus, even when the driver is a type II driver with a lower leg strength, it is possible for the driver to easily depress the accelerator pedal 52. Thereby, the driver can depress the accelerator pedal 52 to cause switching from the cylinder deactivation operation to the all-cylinder operation, as necessary.

It is to be noted that the predetermined time ΔDT from when the throttle opening degree reaches the reaction force generation opening degree S1 to when the reaction force control unit 54 cause the reaction force actuator 53 to generate an additional reaction force is preferably set in advance through experiment and measurement of the like.

Figure 12:
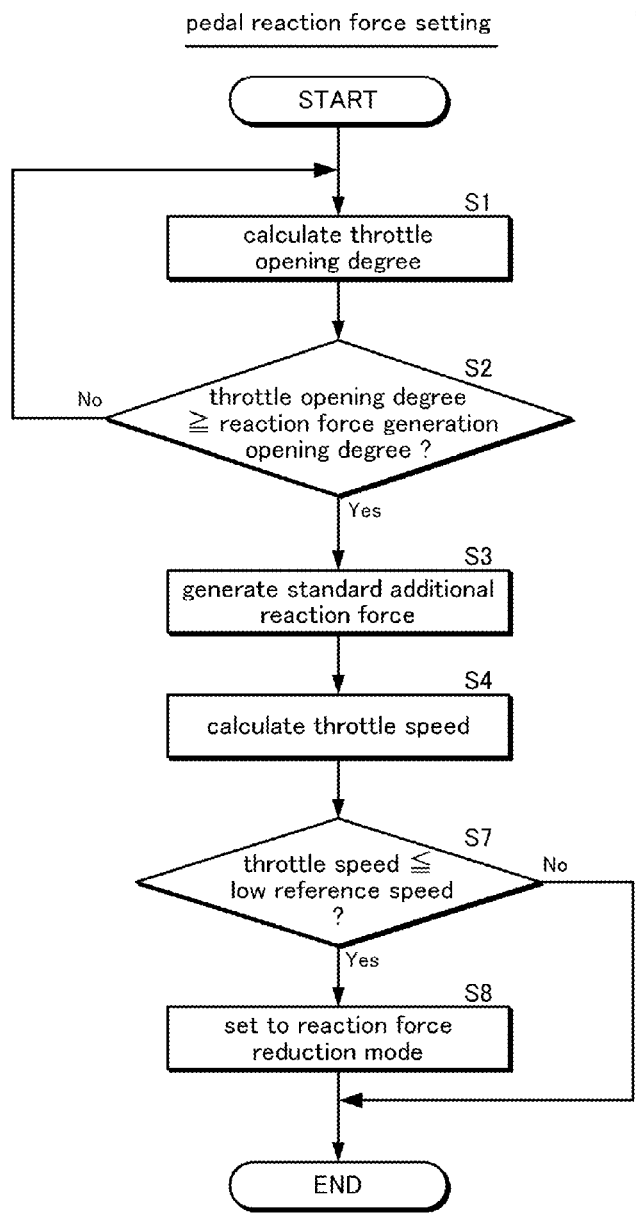
FIG. 12 is a diagram showing a case in which generation of the standard additional reaction force is delayed in the second and third embodiments.

FIG. 12 is a flowchart showing a procedure according to which the reaction force control unit 54 (see FIG. 4) performs the "pedal reaction force setting" to set itself in the reaction force reduction mode (in the following description, see FIG. 4 and FIG. 5, as necessary).

It is to be noted that steps S1 to S4 in FIG. 12 are the same as steps S1 to S4 in FIG. 6, and thus, detailed description thereof will be omitted.

After calculating the throttle speed Svr in step S4, the reaction force control unit 54 compares the calculated throttle speed Svr with a predetermined reference speed on a low-speed side (low reference speed SVL) (step S7). The low reference speed SVL may be the same as or different from the high reference speed SVH used for determining whether the driver is a type I driver in the second embodiment. In a case where the high reference speed SVH and the low reference speed SVL differ from each other, it is preferred that the low reference speed SVL is lower than the high reference speed SVH (SVL<SVH).

If the throttle speed Svr is lower than or equal to the low reference speed SVL (step S7: Yes), the reaction force control unit 54 determines that the driver depressing the accelerator pedal 52 is a type II driver having a lower leg strength, and sets itself in the reaction force reduction mode (step S8) before terminating the pedal reaction force setting.

On the other hand, if it is found in step S7 that the throttle speed Svr is higher than the low reference speed SVL (step S7: No), the reaction force control unit 54 terminates the pedal reaction force setting without setting itself in the reaction force reduction mode.

In a configuration in which the reaction force control unit 54 may be set in the reaction force delay mode, the reaction force control unit 54 sets itself in the reaction force delay mode in step S8 in FIG. 12 instead of the reaction force reduction mode.

As described in the foregoing, the reaction force control unit 54 (see FIG. 4) of the accelerator pedal device 51 in the third embodiment is configured such that, in a case where a driver with lower leg strength (type II driver) is depressing the pedal, the reaction force control unit 54 can cause the reaction force actuator 53 (see FIG. 4) to generate a reduced additional reaction force smaller than the standard additional reaction force and provide the reduced additional reaction force to the accelerator pedal 52 (see FIG. 4) or delay the generation of the additional reaction force from the reaction force actuator 53. Owing to such a configuration, it is possible for the type II driver having a lower leg strength to easily depress the accelerator pedal 52 to cause switching from the cylinder deactivation operation to the all-cylinder operation, as necessary.

As described in the foregoing, in the second embodiment, when a type I driver having a tendency to depress the accelerator pedal 52 (see FIG. 4) quickly depresses the accelerator pedal 52 (see FIG. 4), an enhanced additional reaction force that is larger than the standard additional reaction force is provided to the accelerator pedal 52 when the throttle opening degree reaches the reaction force generation opening degree S1. Owing to this configuration, even a type I driver can readily notice switching from the cylinder deactivation operation to the all-cylinder operation in the cylinder deactivation engine, and thus, it possible to prevent reduction in fuel efficiency due to switching from the cylinder deactivation operation to the all-cylinder operation driver without being noticed by the driver.

Further, in the third embodiment, even a type II driver with a lower leg strength can depress the accelerator pedal 52 (see FIG. 4) to cause switching from the cylinder deactivation operation to the all-cylinder operation, as necessary.

In the second and third embodiments, switching between the cylinder deactivation operation and the all-cylinder operation in the cylinder deactivation engine 57 (see FIG. 4) is taken as an example of switching of driving characteristics of the vehicle V (see FIG. 4), and a configuration is provided to make the driver notice the switching of driving characteristics by varying the pedal reaction force of the accelerator pedal 52 (see FIG. 4). However, switching of driving characteristics of the vehicle V that can be made noticed by the driver by controlling of the pedal reaction force is not limited to the switching between the cylinder deactivation operation and the all-cylinder operation.

For example, in a vehicle V (see FIG. 4) having an automatic transmission (not shown in the drawings) mounted thereon, a configuration may be provided to make the driver notice shift-down timing by controlling the pedal reaction force of the accelerator pedal 52. Further, a configuration may be provided to make the driver notice engagement and disengagement timings of a lock-up clutch by controlling the pedal reaction force of the accelerator pedal 52.

Also, in a hybrid vehicle (not shown in the drawings) equipped with both an electric motor and an internal combustion engine for driving, a configuration may be provided to make the driver notice timings to switch between motor-only driving, engine-only driving, and motor-and-engine driving by controlling the pedal reaction force of the accelerator pedal 52.

Further, in the second and third embodiments, the reaction force control unit 54 (see FIG. 4) is configured to perform the pedal reaction force setting when the vehicle V (see FIG. 4) is started up, namely, when the ignition is turned ON, but it is not limited to such a configuration. For example, the reaction force control unit 54 may be configured to perform the pedal reaction force setting when the reaction force control unit 54 detects restarting of travel of the vehicle V after stopping of the vehicle V and opening and closing of the door on the side of the driver's seat, even if the ignition is kept ON.

In a case where the vehicle V is equipped with a smart key system (not shown in the drawings), the reaction force control unit 54 may be configured to perform the pedal reaction force setting when the reaction force control unit 54 detects start of travel of the vehicle V after moving of the key main body.

In each case, it is likely that the driver has been change, and by performing the pedal reaction force setting as described above, it is possible to provide the accelerator pedal 52 (see FIG. 4) with a pedal reaction force appropriate to the current driver.

Also, it is possible to combine the second embodiment and the third embodiment.

For example, in a case where the throttle speed Svr is higher than the high reference speed SVH when the predetermined time period Δt has elapsed after the throttle opening degree reaches the reaction force generation opening degree S1, the reaction force control unit 54 (see FIG. 4) determines that the driver is a type I driver and sets itself in the reaction force enhancement mode, while in a case where the throttle speed Svr is lower than the low reference speed SVL that is lower than the high reference speed SVH, the reaction force control unit 54 determines that the driver is a type II driver and sets itself in the reaction force reduction mode or reaction force delay mode.

Further, in a case where the throttle speed Svr is lower than or equal to the high reference speed SVH and higher than or equal to the low reference speed SVL when the predetermined time period Δt has elapsed after the throttle opening degree has reaches the reaction force generation opening degree S1, the reaction force control unit 54 (see FIG. 4) does not set itself in the reaction force enhancement mode, reaction force reduction mode, or reaction force delay mode. In this case, when the throttle opening degree reaches the reaction force generation opening degree S1, a standard additional reaction force is generated by the reaction force actuator 53 (see FIG. 4).

As described in the foregoing, by providing the high reference speed SVH and the low reference speed SVL (where SVH>SVL) as reference speeds for the throttle speed Svr, and by setting the reaction force control unit 54 (see FIG. 4) in the reaction force enhancement mode when the throttle speed Svr is higher than the high reference speed SVH and in the reaction force reduction mode when throttle speed Svr is lower than the low reference speed SVL in the pedal reaction force setting, it is possible to control the pedal reaction force appropriately for any driver which may be a type I driver having a tendency to depress the pedal quickly, a type II driver having a tendency to depress the pedal slowly, or any other driver.

Concrete embodiments of the present invention have been described in the foregoing, but the present invention is not limited by the foregoing embodiments. For instance, in the foregoing embodiments, the driver's requested output is calculated based on the amount of depression of the accelerator pedal, and the output difference between the requested output and the maximum output that the engine can produce under the cylinder deactivation operation is obtained. However, instead of the requested output, it is possible to use the amount of depression of the accelerator pedal itself. Further, in the foregoing embodiments, the reaction force control unit estimates the number of to-be-reactivated cylinders, but the engine ECU may perform this estimation and output the result of estimation to the reaction force control unit. It is also possible to provide the accelerator pedal with the same depression reaction force irrespective of the number of to-be-reactivated cylinders. Further, it is possible to increase the target reaction force along a quadratic curve from the point where the output difference reaches the reaction force start threshold value to the maximum reaction force threshold value. Besides, the concrete configuration of the accelerator pedal depression reaction force control device and the concrete procedure for control performed thereby may be altered freely so long as the alteration does not depart from the principle of the present invention.

GLOSSARY 1 accelerator pedal reaction force control device
2 accelerator pedal
3 reaction force actuator (reaction force providing means)
4 reaction force control unit (target depression reaction force setting means)
11 accelerator position sensor (depression amount detection means)
22 engine (cylinder deactivation engine)
29 vehicle speed sensor (vehicle speed detection means)
51 accelerator pedal device
52 accelerator pedal
53 reaction force actuator (reaction force providing means)
54 reaction force control unit (target depression reaction force setting means, operation speed detection means)
55 accelerator position sensor (operation amount detection means)
57 cylinder deactivation engine
57a cylinder deactivation mechanism
58 engine ECU (engine control means)
60 accelerator pedal reaction force control device
V vehicle

The invention claimed is:

1. An accelerator pedal reaction force control device that is mounted on a motor vehicle provided with a cylinder deactivation engine and controls a depression reaction force of an accelerator pedal for adjusting an output of the cylinder deactivation engine, wherein the cylinder deactivation engine is provided with a depression amount detection means that detects an amount of depression of the accelerator pedal such that cylinder reactivation control for increasing a number of active cylinders is performed when an operation state quantity including the amount of depression of the accelerator pedal becomes larger than a cylinder reactivation threshold value, and cylinder deactivation control for reducing the number of active cylinders is performed when the operation state quantity becomes smaller than a cylinder deactivation threshold value, the accelerator pedal reaction force control device comprising:
   a reaction force providing device that provides the accelerator pedal with a depression reaction force; and
   a target depression reaction force setting device that sets a target depression reaction force for the reaction force providing device,
   wherein, in a case where the cylinder deactivation engine is in a cylinder deactivation operation state in which some of the cylinders are inactive, the target depression reaction force setting device calculates a requested output for the cylinder deactivation engine based on the operation state quantity including the amount of depression of the accelerator pedal, estimates a maximum output that can be produced by the cylinder deactivation engine in the cylinder deactivation operation state, calculates a difference between the maximum output and the requested output as an output difference, and then, increases the target depression reaction force in accordance with the output difference.

2. The accelerator pedal reaction force control device according to claim 1, wherein the target depression reaction force setting device increases the target depression reaction force when the output difference exceeds a predetermined value.

3. The accelerator pedal reaction force control device according to claim 2, wherein the target depression reaction force setting device increases the target depression reaction force at a predetermined increase rate as the output difference approaches zero after the output difference has reached the predetermined value.

4. The accelerator pedal reaction force control device according to claim 3,
   wherein the cylinder deactivation engine performs the cylinder deactivation operation in two or more stages, and
   wherein the target depression reaction force setting device uses a larger increase rate for a larger number of active cylinders to be increased by the cylinder reactivation control.

5. The accelerator pedal reaction force control device according to claim 1, further comprising a vehicle speed detection device that detects a vehicle speed, wherein the target depression reaction force setting device does not increase the target depression reaction force if the vehicle speed exceeds a predetermined high speed travel determination threshold value.

6. The accelerator pedal reaction force control device according to claim 1, further comprising an operation speed detection device that detects an operation speed of the accelerator pedal,
wherein the target depression reaction force setting device changes the increase rate of the target depression reaction force based on a result of comparison of the operation speed for a predetermined time period from a point when the accelerator pedal is depressed to a position where the target depression reaction force is to be increased with a predetermined reference speed.

7. The accelerator pedal reaction force control device according to claim 6,
wherein a high reference speed serving as a reference for the operation speed on a high-speed side is preset as the reference speed,
and wherein, when the operation speed is higher than the high reference speed, the target depression reaction force setting device changes the increase rate of the target depression reaction force so as to increase a degree by which the target depression reaction force is increased.

8. The accelerator pedal reaction force control device according to claim 6,
wherein a low reference speed serving as a reference for the operation speed on a low-speed side is preset as the reference speed,
and wherein, when the operation speed is lower than the low reference speed, the target depression reaction force setting device changes the increase rate of the target depression reaction force so as to decrease a degree by which the target depression reaction force is increased.

9. The accelerator pedal reaction force control device according to claim 6,
wherein a low reference speed serving as a reference for the operation speed on a low-speed side is preset as the reference speed
and wherein, when the operation speed is lower than the low reference speed, the target depression reaction force setting device changes the increase rate of the target depression reaction force so as to delay start of adjustment for increasing the target depression reaction force.

10. The accelerator pedal reaction force control device according to claim 6, wherein, when the amount of operation becomes larger than or equal to the set value after the increase rate of the target depression reaction force is changed based on the result of comparison between the operation speed and the reference speed, the target depression reaction force setting device adjusts the target depression reaction force so as to increase the target depression reaction force at the changed increase rate, irrespective of the operation speed.

11. The accelerator pedal reaction force control device according to claim 6, wherein the target depression reaction force setting device changes the increase rate of the target depression reaction force only when a fore-and-aft acceleration and a lateral acceleration generated in the vehicle each are smaller than or equal to respective predetermined values.

12. The accelerator pedal reaction force control device according to claim 7,
wherein a low reference speed serving as a reference for the operation speed on a low-speed side is preset as the reference speed,
and wherein, when the operation speed is lower than the low reference speed, the target depression reaction force setting device changes the increase rate of the target depression reaction force so as to decrease a degree by which the target depression reaction force is increased.

13. The accelerator pedal reaction force control device according to claim 7,
wherein a low reference speed serving as a reference for the operation speed on a low-speed side is preset as the reference speed
and wherein, when the operation speed is lower than the low reference speed, the target depression reaction force setting device changes the increase rate of the target depression reaction force so as to delay start of adjustment for increasing the target depression reaction force.

14. The accelerator pedal reaction force control device according to claim 7, wherein, when the amount of operation becomes larger than or equal to the set value after the increase rate of the target depression reaction force is changed based on the result of comparison between the operation speed and the reference speed, the target depression reaction force setting device adjusts the target depression reaction force so as to increase the target depression reaction force at the changed increase rate, irrespective of the operation speed.

15. The accelerator pedal reaction force control device according to claim 7, wherein the target depression reaction force setting device changes the increase rate of the target depression reaction force only when a fore-and-aft acceleration and a lateral acceleration generated in the vehicle each are smaller than or equal to respective predetermined values.

16. The accelerator pedal reaction force control device according to claim 8, wherein, when the amount of operation becomes larger than or equal to the set value after the increase rate of the target depression reaction force is changed based on the result of comparison between the operation speed and the reference speed, the target depression reaction force setting device adjusts the target depression reaction force so as to increase the target depression reaction force at the changed increase rate, irrespective of the operation speed.

17. The accelerator pedal reaction force control device according to claim 8, wherein the target depression reaction force setting device changes the increase rate of the target depression reaction force only when a fore-and-aft acceleration and a lateral acceleration generated in the vehicle each are smaller than or equal to respective predetermined values.

18. The accelerator pedal reaction force control device according to claim 9, wherein, when the amount of operation becomes larger than or equal to the set value after the increase rate of the target depression reaction force is changed based on the result of comparison between the operation speed and the reference speed, the target depression reaction force setting device adjusts the target depression reaction force so as to increase the target depression reaction force at the changed increase rate, irrespective of the operation speed.

19. The accelerator pedal reaction force control device according to claim 9, wherein the target depression reaction force setting device changes the increase rate of the target depression reaction force only when a fore-and-aft acceleration and a lateral acceleration generated in the vehicle each are smaller than or equal to respective predetermined values.

20. The accelerator pedal reaction force control device according to claim 10, wherein the target depression reaction force setting device changes the increase rate of the target depression reaction force only when a fore-and-aft acceleration and a lateral acceleration generated in the vehicle each are smaller than or equal to respective predetermined values.

* * * * *